United States Patent
Sato

(10) Patent No.: US 6,305,452 B1
(45) Date of Patent: Oct. 23, 2001

(54) PNEUMATIC RADICAL TIRE FOR PASSENGER CAR WITH CARCASS PLY CUT-OUT ZONE

(75) Inventor: Takayuki Sato, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/465,420

(22) Filed: Dec. 16, 1999

(30) Foreign Application Priority Data

Jun. 1, 1999 (JP) ................................................. 11-153187

(51) Int. Cl.[7] ................................. B60C 9/00; B60C 9/08; B60C 15/00
(52) U.S. Cl. ........................... 152/555; 152/548; 152/551; 152/557
(58) Field of Search ..................................... 152/550, 551, 152/557, 555, 548, 558, 560

(56) References Cited

U.S. PATENT DOCUMENTS

| | | | |
|---|---|---|---|
| 3,233,649 | * | 2/1966 | Jolivet et al. ..................... 152/550 X |
| 3,442,315 | * | 5/1969 | Mirtain ............................... 152/557 X |
| 3,509,930 | * | 5/1970 | Mirtain ............................... 152/557 X |
| 3,554,260 | * | 1/1971 | Mirtain et al. ..................... 152/551 X |
| 4,096,899 | * | 6/1978 | Kitazawa et al. ................. 152/550 X |
| 4,185,675 | * | 1/1980 | Greiner et al. .................... 152/550 X |
| 4,287,929 | * | 9/1981 | Huinink ............................. 152/557 X |
| 5,273,094 | * | 12/1993 | Chavet .............................. 152/551 X |
| 5,435,370 | * | 7/1995 | Ahmad et al. ........................ 152/550 |
| 5,688,343 | * | 11/1997 | Minami et al. ................... 152/551 X |
| 5,759,315 | * | 6/1998 | Suzuki et al. ..................... 152/550 X |
| 5,795,416 | * | 8/1998 | Williard, Jr. et al. ................ 152/550 |

FOREIGN PATENT DOCUMENTS

| 1211735 | * | 3/1960 | (FR) ..................................... 152/551 |
| 2 017 016 A | * | 10/1979 | (GB) ..................................... 152/551 |

* cited by examiner

Primary Examiner—Adrienne C. Johnstone
(74) Attorney, Agent, or Firm—Sughrue, Mion, Zinn, Macpeak & Seas, PLLC

(57) ABSTRACT

A pneumatic radial tire for passenger car comprises a radial carcass comprised of at least one rubberized carcass ply containing organic fiber cords therein, and a belt comprised of plural belt layers, wherein at least one carcass ply has a cut-out zone in its crown portion and a carcass supporting layer is arranged adjacent to the cut-out zone.

11 Claims, 3 Drawing Sheets

PNEUMATIC RADICAL TIRE FOR PASSENGER CAR WITH CARCASS PLY CUT-OUT ZONE

BACKGROUND OF THE INVENTION

1. Field of the Invention

This invention relates to a pneumatic radial tire for passenger car capable of simultaneously establishing the steering stability and the ride comfort.

2. Description of Related Art

In the pneumatic radial tire for passenger car, it is common to ensure the ride comfort and the steering stability together by constituting the carcass with one to three carcass plies containing organic fiber cords therein.

Recently, it strongly tends to make the grade of the passenger car higher, and hence it is demanded to more improve the ride comfort of the passenger car tire.

However, the ride comfort and the steering stability are conflicting with each other. In general, if it is intended to improve the ride comfort, the steering stability is apt to be degraded. Therefore, it is demanded to develop a new way for simultaneously satisfying the ride comfort and the steering stability.

SUMMARY OF THE INVENTION

It is, therefore, an object of the invention to provide a pneumatic radial tire for passenger car realizing the improvement of the ride comfort without sacrificing the steering stability.

In order to simultaneously establish the ride comfort and the steering stability, the inventor has examined the basic structure of the tire and found out that it is advantageous to remove a portion of the carcass located beneath the belt to reduce the stiffness in the crown portion of the tire for improving the ride comfort and the excellent steering stability can be maintained by supplementing the stiffness of the belt corresponding to the removed portion of the carcass in the widthwise direction with a proper means. As a result, the invention has been accomplished.

According to the invention, there is the provision of a pneumatic radial tire for passenger car comprising a carcass of a radial structure toroidally extending between a pair of bead cores and comprised of at least one rubberized carcass ply containing organic fiber cords therein, and a belt reinforcing a crown portion of the carcass and comprised of plural belt layers, wherein at least one carcass ply has a cut-out zone in its crown portion and a carcass supporting layer is arranged adjacent to the cut-out zone.

In a preferable embodiment of the invention, a modulus of elasticity of the carcass supporting layer is lower than that of the carcass.

In another preferable embodiment of the invention, a length of the cut-out zone in a widthwise direction of the tire is 20–70% of a maximum width of the belt.

In the other preferable embodiment of the invention, the carcass supporting layer is a rubberized body containing a plurality of organic fiber cords having a diameter of 0.1–0.5 mm.

It is also preferable that the organic fiber cord has a melting point of not higher than 150° C.

In a further preferable embodiment of the invention, a belt reinforcing layer covering at least a side end of the belt is arranged at an outside of the belt in a radial direction of the tire.

BRIEF DESCRIPTION OF THE DRAWINGS

The invention will be described with reference to the accompanying drawings, wherein.

DESCRIPTION OF PREFERRED EMBODIMENTS

Figure 1:
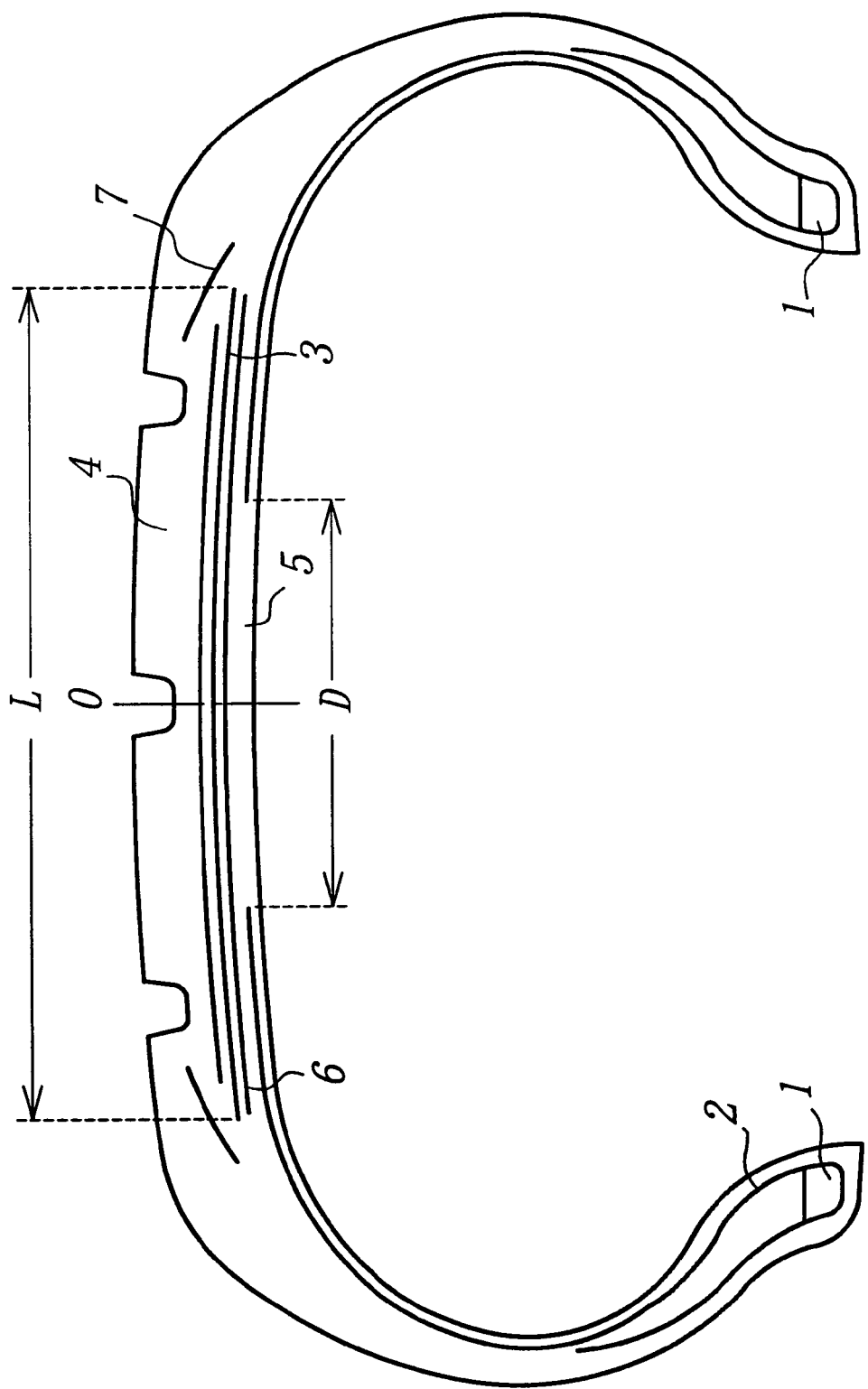
FIG. 1 is a diagrammatically section view of a first embodiment of the pneumatic radial tire according to the invention.

In FIG. 1 is sectionally shown a first embodiment of the pneumatic radial tire for passenger car according to the invention, wherein numeral 1 is a bead core, numeral 2 a carcass, numeral 3 a belt and numeral 4 a tread.

The carcass 2 is comprised of one or more rubberized carcass plies of a radial structure toroidally extending between the pair of the bead cores 1 and containing organic fiber cords therein. In the invention, it is important that at least one carcass ply has a cut-out zone 5 in its crown portion. That is, the crown portion of the carcass 2 is cut out to give a flexibility to the crown portion of the tire, whereby vibrations transmitted from a road surface are absorbed with the tire crown portion to attain the improvement of the ride comfort and the reduction of noise. And also, the formation of the cut-out zone 5 results in the reduction of the material used for the carcass, so that the weight reduction is also attained.

It is preferable that a length D of the cut-out zone 5 in a widthwise direction of the tire is 20–70% of a maximum width L of the belt 3 centering an equatorial plane O of the tire. When the length D of the cut-out zone 5 is less than 20%, the effect of improving the ride comfort can not sufficiently be obtained, while when it exceeds 70%, the function of the carcass for holding an air pressure of the tire is not developed and hence the durability of the tire is degraded.

On the other hand, the presence of the cut-out zone 5 in the crown portion of the carcass 2 decreases the stiffness of the tire to bring about the degradation of the steering stability. In the invention, therefore, a carcass supporting layer 6 is arranged adjacent to the cut-out zone 5. In the illustrated embodiment, the carcass supporting layer 6 is arranged on an outside of the cut-out zone 5 in the radial direction so as to have a width at least covering the cut-out zone 5. The carcass supporting layer 6 supplements the stiffness of the belt in the widthwise direction in the tire crown portion to suppress the degradation of the steering stability.

When the stiffness of the belt 3 in the widthwise direction is supplemented by the carcass supporting layer 6, if the stiffness is excessively given, there is a fear of decreasing the improving effect of the ride comfort by the cut-out zone 5. Therefore, the carcass supporting layer 6 is favorable to have a modulus of elasticity lower than that of the carcass 2. Concretely, the carcass supporting layer 6 has a modulus of elasticity of about 1–30 kgf per width of 1 mm.

Particularly, it is advantageous that the carcass supporting layer 6 acts to mainly supplement the tensile stiffness of the belt 3 in the widthwise direction to ensure the steering stability and to maintain the improvement of the ride comfort through the cut-out zone 5 without influencing upon the bending stiffness. For this end, it is favorable to make the thickness of the carcass supporting layer 6 thin. Concretely, the thickness of the carcass supporting layer 6 is preferably not more than 1.0 mm. However, when the thickness of the carcass supporting layer 6 is less than 0.1 mm, the diameter of the organic fiber cord used in the carcass supporting layer is so fine that it is difficult to provide tensile stiffness required for maintaining the steering stability, so that the thickness of the carcass supporting layer is favorable to be not less than 0.1 mm.

As the carcass supporting layer 6, it may be used to embed a cloth or a non-woven cloth in rubber, but it is recommended to use a composite formed by arranging a plurality of organic fiber cords having a diameter of 0.1–0.5 mm in parallel to each other and coating them with rubber. That is, the carcass supporting layer 6 is advantageous to be a rubber composite wherein organic fiber cords such as nylon, polyester, rayon, vinylon and the like are arranged at an end count of 50 cords/50 mm so as to extend in the radial direction.

Figure 2:
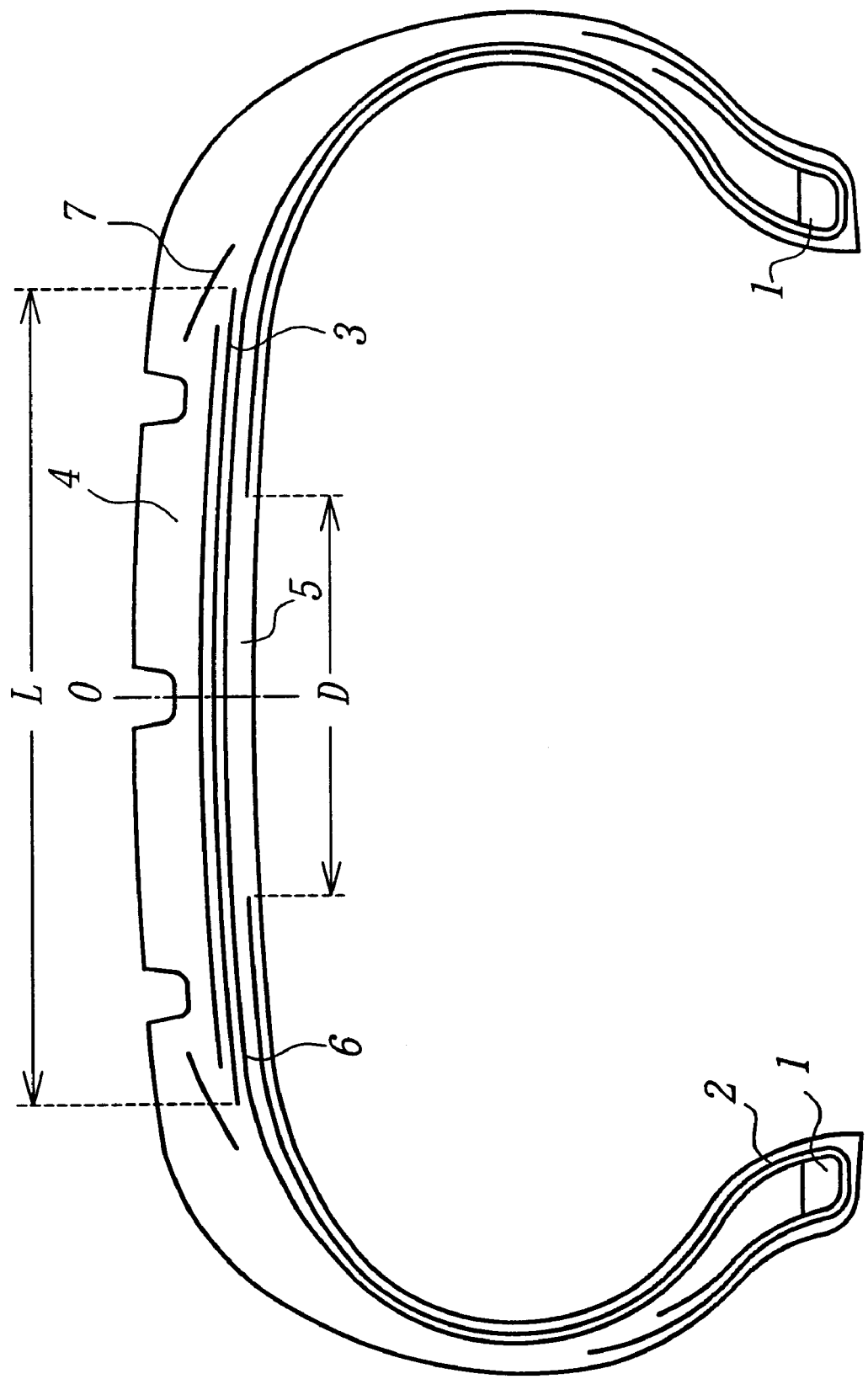
FIG. 2 is a diagrammatically section view of a second embodiment of the pneumatic radial tire according to the invention.

Moreover, the carcass supporting layer 6 is enough to have a width at least covering the cut-out zone 5, but both side ends of the carcass supporting layer 6 may be extended so as to reach the respective bead portion as shown in FIG. 2. Although the carcass supporting layer 6 is arranged at the outside of the carcass 2 having the cut-out zone 5 in the radial direction in the illustrated embodiment, it may be arranged at the inside of the carcass in the radial direction.

As the cut-out zone 5 is existent in the crown portion of the carcass 2, it is difficult to stabilize the manufacture of the tire and there is caused a fear of badly affecting the uniformity of the tire manufactured. That is, when a green tire is expanded in a mold during the vulcanization, since the carcass ply is discontinuous, it is difficult to uniformly expand the green tire, and particularly there is a possibility that the scattering of the shape is caused at both sides of the tire in the widthwise direction, which may result in the degradation of the tire uniformity. Therefore, it is desirable that the stiffness required for the vulcanization is maintained even at the cut-out zone 5 until the completion of the tire vulcanization, while the modulus of elasticity at the cut-out zone 5 lowers after the vulcanization. For this end, the carcass supporting layer 6 covering the cut-out zone 5 is advantageous to be made from organic fiber cords melting at a vulcanization temperature of about 150–200° C. so as to reduce the modulus of elasticity on the border of the vulcanization step.

The belt 3 is comprised of at least two laminated belt layers, preferably 2–3 belt layers each containing a plurality of rubberized steel cords, wherein the steel cords of these layers are crossed with each other and arranged at a cord angle of 15–30° with respect to the equatorial plane of the tire. Further, a belt reinforcing layer 7 formed by winding a textile cord in the circumferential direction may be disposed as shown in the illustrated embodiment in order to suppress separation failure at the end of the belt 3.

Figure 3:
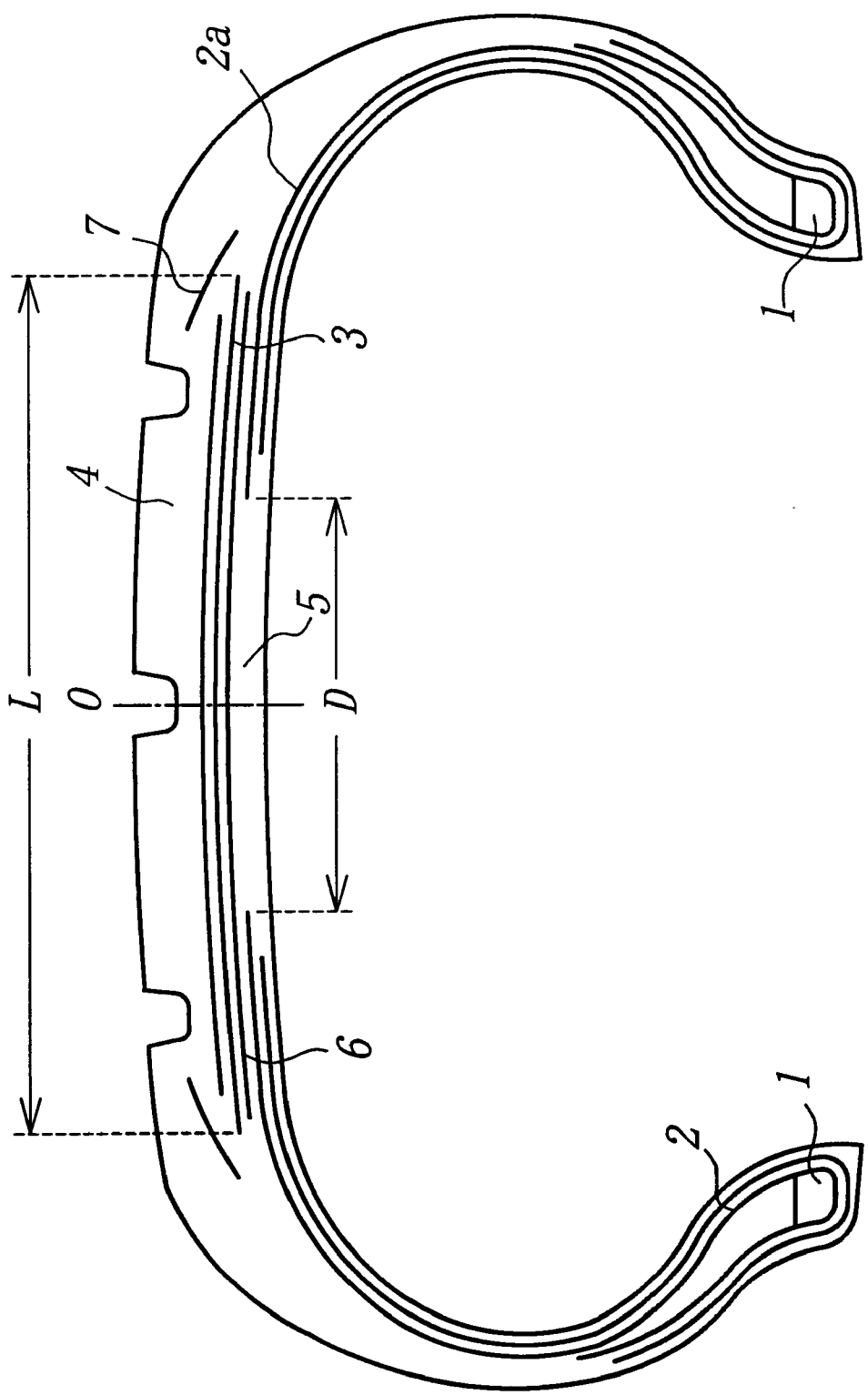
FIG. 3 is a diagrammatically section view of a third embodiment of the pneumatic radial tire according to the invention.

In FIGS. 1 and 2 is shown a case that the carcass 2 is comprised of a single carcass ply, but the carcass may be comprised of plural plies, for example, as shown in FIG. 3.

As the cord for the carcass 2, it is adaptable to use cords of an organic fiber such as rayon, polyethylene-2,6-naphthalate (PEN), polyethylene terephthalate (PET), polyolefin ketone (POK), nylon or the like, and it is favorable to arrange such organic fiber cords at an end count of 40–70 cords/50 mm.

The following examples are given in illustration of the invention and are not intended as limitations thereof.

EXAMPLES 1–6

There are provided radial tires for passenger car having a tire size of 205/60R15 by applying various structures shown in Table 1 to a carcass 2 shown in FIGS. 1 or 2. Moreover, a belt 3 is comprised of two belt layers each containing steel cords of 1×5 structure arranged at an end count of 40 cords/50 mm, wherein the steel cords of these layers are crossed with each other and arranged at a cord angle of 20° with respect to an equatorial plane of the tire. Furthermore, a belt reinforcing layer 7 is formed by winding a nylon cord of 1260 d/2 at an end count of 40 cords/50 mm along the equatorial plane of the tire.

And also, there is provided a conventional tire having the same tire structure as shown in FIG. 1 except that the carcass is continuous without forming the cut-out zone.

With respect to these tires, the uniformity is measured and tests for the steering stability and ride comfort are carried out to obtain results as shown in Table 1.

The uniformity of the tire is evaluated by mounting the tire onto a recommended rim, inflating under an internal pressure of 2.0 kgf/cm$^2$, pushing toward a metal drum of 3 m in diameter under a load corresponding to such an internal pressure defined in JATMA and then rotating the drum at a slightly low speed to measure lateral force variation (LFV). In this case, several ten tires of the same kind are manufactured and the lateral force variation of each tire is measured. When a tire indicating the lateral force variation of not less than 50N is nonstandardized, the uniformity is represented by a ratio of the number of the nonstandardized tires to the total tires of the same kind (%).

The test for the steering stability is carried out by mounting the tire onto the recommended rim, inflating under an air pressure corresponding to a maximum load capacity, and mounting, onto a passenger car having a displacement of 2500 cc and then running at a speed of 60–200 km/h, during which straight running stability, cornering stability, handling and the like are evaluated by feeling. Moreover, the evaluation results are represented by an index on the basis that the conventional tire is an evaluating standard (0), wherein the larger the index value, the better the property.

The ride comfort is evaluated by the same feeling test as in the test for the steering stability after the tire is mounted onto the passenger car.

TABLE 1

|  | Example 1 | Example 2 | Example 3 | Example 4 | Example 5 | Example 6 | Conventional tire |
|---|---|---|---|---|---|---|---|
| Carcass structure (end count) | PET cord 1670 dtex/2 (55 cords/50 mm) | PET cord 1670 dtex/2 (55 cords/50 mm) | Rayon cord 1840 dtex/2 (55 cords/50 mm) | POK cord 1670 dtex/2 (55 cords/50 mm) | Rayon cord 1830 dtex/2 (55 cords/50 mm) | PEN cord 1670 dtex/2 (55 cords/50 mm) | PET cord 1670 dtex/2 (55 cords/50 mm) |
| Ratio of width of cut-out zone to maximum belt width (%) | 20 | 20 | 50 | 40 | 25 | 35 | 0 |
| Carcass supporting layer (end count) [melting point] | 66 nylon cord 230 dtex/2 (50 cords/50 mm) [230° C.] | 66 nylon cord 470 dtex/2 (15 cords/50 mm) [230° C.] | vinylon canvas 230 dtex/2 [247° C.] | non-woven nylon cloth [220° C.] | 66 nylon cord 470 dtex/2 (10 cords/50 mm) [230° C.] | PET cord 560 dtex/2 (10 cords/50 mm) [262° C.] | none |
| Width of carcass supporting layer | continuous between bead portions (FIG. 2) | belt width (FIG. 1) | belt width (FIG. 1) | belt width (FIG. 1) | belt width (FIG. 1) | belt width (FIG. 1) | none |
| Cord diameter in carcass supporting layer (mm) | 0.27 | 0.35 | 0.28 | — | 0.35 | 0.40 | none |
| Thickness of carcass supporting layer (mm) | 0.50 | 0.70 | 0.50 | 0.50 | 0.6 | 0.6 | none |
| Uniformity | 100% | 99% | 98% | 98% | 98 | 98 | 100% |
| Steering stability | 0 | 0 | 0 | 0 | 0 | 0 | 0 |
| Ride comfort | +1 | +2 | +3 | +2 | +3 | +2 | 0 |

EXAMPLES 7–10

There are provided radial tires for passenger car having a tire size of 205/60R15 by applying various structures shown in Table 2 to a carcass 2 shown in FIG. 1 or 2. Moreover, the belt 3 and the belt reinforcing layer 7 are the same as those in Example 1.

And also, there are provided a conventional tire having the same tire structure as shown in FIG. 1 except that the carcass is continuous without forming the cut-out zone and a comparative tire having the same tire structure as shown in FIG. 1 except that the carcass supporting layer is omitted. With respect to these tires, the uniformity is measured and tests for the steering stability and ride comfort are carried out in the same manner as in Example 1 to obtain results shown in Table 2.

TABLE 2

|  | Example 7 | Example 8 | Example 9 | Example 10 | Comparative tire | Conventional tire |
|---|---|---|---|---|---|---|
| Carcass structure (end count) | PET cord 1500 dtex/2 (55 cords/50 mm) | Rayon cord 1830 dtex/2 (55 cords/50 mm) | PET cord 1670 dtex/2 (55 cords/50 mm) | PET cord 1670 dtex/2 (55 cords/50 mm) | PET cord 1670 dtex/2 (55 cords/50 mm) | PET cord 1670 dtex/2 (55 cords/50 mm) |
| Ratio of width of cut-out zone to maximum belt width | 20 | 50 | 40 | 50 | 50 | 0 |
| Carcass supporting layer (end count) [melting point] | polyethylene cord 390 dtex/2 (10 cords/50 mm) [about 130° C.] | polyethylene cord 390 dtex/2 (50 cords/50 mm) [about 130° C.] | polyethylene cord 390 dtex/2 (50 cords/50 mm) [about 130° C.] | polypropylene cord 390 dtex/2 (50 cords/50 mm) [about 170° C.] | none | none |
| Width of carcass supporting layer | continuous between bead portions (FIG. 2) | belt width (FIG. 1) | belt width (FIG. 1) | belt width (FIG. 1) | none | none |
| Width of carcass supporting layer (mm) | 0.38 | 0.38 | 0.38 | 0.39 | none | none |
| Thickness of carcass supporting layer (mm) | 0.70 | 0.70 | 0.70 | 0.70 | none | none |
| Uniformity | 100% | 98% | 99% | 98% | 85% | 100% |
| Steering stability | +2 | +2 | 0 | 0 | −1 | 0 |
| Ride comfort | +2 | +4 | +3 | +0.5 | +4 | 0 |

As mentioned above, according to the invention, the ride comfort is improved by forming the cut-out zone in the carcass while attaining the weight reduction, and further the lowering of the steering stability due to the presence of the cut-out zone is prevented by disposing the carcass supporting layer. Therefore, the invention can cope with the tendency of making the grade of the passenger car higher without damaging the basic performances of the car.

What is claimed is:

1. A pneumatic radial tire for passenager car comprising: a carcass of a radial structure torodally extending between a pair of bead cores and comprised of at least one rubberized carcass ply containing organic fiber cords therein, and a belt reinforcing a crown portion of the carcass and comprised of plural belt layers, at least one carcass ply has a cut-out zone it its crown portion, and a carcass supporting layer arranged adjacent to and radially outside the cut-out zone, said carcass supporting layer being a rubberized body containing a plurality of organic fiber cords having diameter of 0.1–0.5 mm.

2. A pneumatic radial tire according to claim 1, wherein a modulus of elasticity of the carcass supporting layer is lower than that of the carcass.

3. A pneumatic radial tire according to claim 1, wherein a length of the cut-out zone in a widthwise direction of the tire is 20–70% of a maximum width of the belt.

4. A pneumatic radial tire according to claim 1, wherein the organic fiber cord has a melting point of not higher than 150° C.

5. A pneumatic radial tire according to claim 1, wherein a belt reinforcing layer covering at least a side end of the belt is arranged at an outside of the belt in a radial direction of the tire.

6. A pneumatic radial tire according to claim 1, wherein said carcass supporting layer has a modulus of elasticity of about 1–30 kgf per width of 1 mm.

7. A pneumatic radial tire according to claim 1, wherein said carcass supporting layer has a thickness no greater than 1.0 mm.

8. A pneumatic radial tire according to claim 1, wherein said carcass supporting layer is a rubber composite whose organic cords are arranged at an end count of 50 cords/50 mm extending in the radial direction.

9. A pneumatic radial tire according to claim 1, wherein said carcass supporting layer has a width covering said carcass ply cut-out zone.

10. A pneumatic radial tire according to claim 1, wherein said carcass supporting layer extends to each of said bead cores.

11. A pneumatic radial tire according to claim 1, wherein said carcass structure comprises a second rubberized carcass ply having a cut-out zone in its crown portion.

* * * * *